Figure 1:
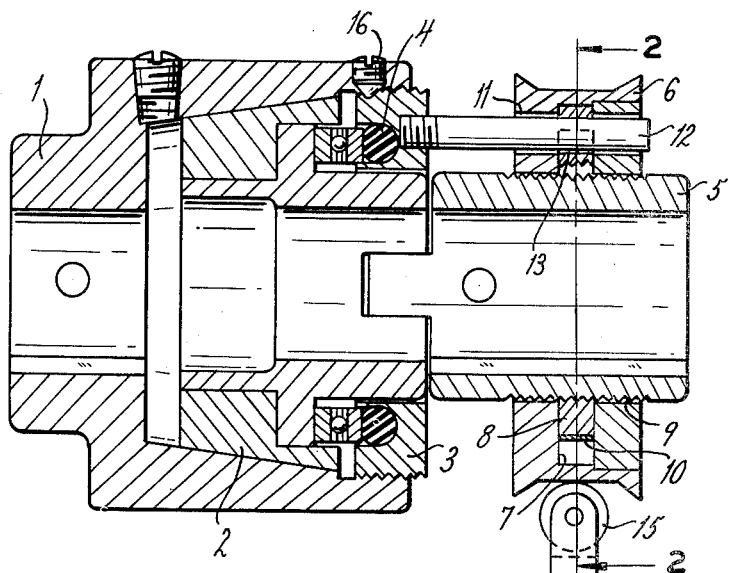

Sept. 15, 1953     J. J. FLATON     2,652,135

AUTOMATIC SHUTOFF SAFETY CLUTCH COUPLING

Filed Nov. 8, 1950

*INVENTOR.*
JACOB J. FLATON
BY
*ATTORNEY*

Patented Sept. 15, 1953

2,652,135

UNITED STATES PATENT OFFICE 2,652,135

AUTOMATIC SHUTOFF SAFETY CLUTCH COUPLING

Jacob J. Flaton, Lemay, Mo.

Application November 8, 1950, Serial No. 194,653

5 Claims. (Cl. 192—150)

1

This invention pertains to an improvement in safety clutches of the type arranged to slip at a given maximum torque whereby an improved means is provided, operable upon sufficient slippage to shut off the source of power which drives the device.

In the specific embodiment illustrated herein, the driven member which is attached to the load is engageable by means of a releasable threaded connection with actuating means connected to operate the power shut-off device. The actuator is connected to the driving member of the clutch so that when the clutch slips and the driven member stops, the actuator is driven in rotation by said driving member, whereupon the threaded connection thereof with the load member functions to move said actuator to operate the shut-off device. The threaded connection is such that the device may be reset by simply moving one threaded member axially with relation to the complementary member, the threads thereof passing each other by a sort of ratchet movement.

Referring now to the drawing in which one embodiment of this invention is illustrated—

Figure 2:
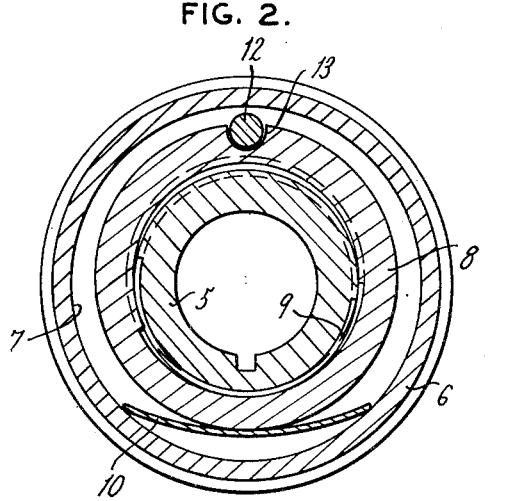
Figure 2:
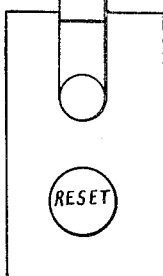

Fig. 1 is a sectional view taken through the center of the driving shaft of a torque limiting clutch equipped with means for actuating the shut-off device embodying this invention; and Fig. 2 is a section on line 2—2 of Fig. 1.

In the embodiment illustrated, a torque limiting clutch is shown comprising a cone cup 1 which is connected to the source of driving power and constitutes the driving member of the clutch. A cone plug 2 fitted into the cup 1 for frictional engagement therewith constitutes the driven member of the clutch. An adjusting nut 3 is threaded into the end of the driving member 1 and carries in an annular recess therein a pressure ring 4 which may be of rubber, or the like, adapted to exert a yielding pressure. The nut 3 may be adjusted in the member 1 so that the ring 4 exerts any desired pressure on the plug 2, forcing that plug into the cone cup with a force which determines the maximum torque that the clutch will transmit.

The clutch so far described has been in use in the art for several years and constitutes no part of the present invention.

Connected to the driven member 2 of the clutch by means of jaws, or other suitable connections, or even made integral therewith, is a load member 5, which is secured to the load shaft to be driven. The member 5 is provided with an external thread 9 on its outer surface. An actuator ring 8 is arranged to encircle the member

2

5 and is provided with an internal thread engageable with the thread 9 of the member 5. The internal thread of the actuator 8 is made considerably larger in diameter than the thread 9 so that the minor diameter of the internal thread is greater than the major diameter of the external thread 9. Accordingly, when these threads are engaged with each other, such engagement takes place in a region at the end of a diameter of the ring 8 while that portion of said ring at the other end of such diameter is clear of the threads 9.

The ring 8 is housed in an annular recess 7 in a collar 6 which is movably seated on the outside of the load member 5 in such a manner that it is movable both axially and circumferentially with respect to the member 5 so that it may move back and forth over the thread 9. The collar 6 may be grooved, or otherwise formed, at its outer periphery so as to be operably engageable with the operating handle or button 15 of a power shut-off device. Such device may be a limit switch connected to shut off the power to an electric motor by which the clutch may be driven, or if driven by an engine, the device 15 may be a valve or other shut-off means.

The ring 8 is connected to the driving member of the clutch by a connector in the form of a stud 12 secured in the nut 3, which nut is, of course, locked in its adjusted position by a set screw 16, or other suitable means. The stud 12 engages a groove 13 in the ring 8 so that said ring is always forced to move in rotation with the driving member of the clutch. The stud 12 also passes through an opening 11 in the collar 6 in order to gain access to the ring 8. The groove 7 is large enough to permit radial movement of the ring 8. However, said ring is yieldingly maintained in engagement with the thread 9 by a leaf spring 10 seated in the recess 7 and bearing at its middle portion upon the circumference of the ring 8 as shown in Fig. 2.

In the operation of this device the collar 6 and the ring 8 are set so as to engage the thread 9 at about its middle portion. So long as the clutch drives its load without slipping, this position is maintained as there is no relative movement between the ring 8 and the load member 5. However, as soon as an obstruction is encountered or other occurrence puts a sufficient load on the device to cause the plug 2 to slip in the cone member 1, the load shaft to which the member 5 is attached will stop or run slowly. Since the stud 12 continues to rotate the ring 8 with the driving member 1, such stoppage or slowing of the member 5 will cause relative rotation between the nut member and the ring 8. By such rotation the threaded engagement of the ring 8 and the member 5 will cause said ring to be moved axially of the member 5 in one direction or the other according to the direction of rotation of the driving member 1. As the ring 8 moves axially, it carries with it the collar 6 which after a predetermined movement engages the device 15 to drive the latter and cause it to shut off the power which drives the device. The collar 6 thus provides a tripping member for operating the device 15. Therefore, an overload sufficient to cause the clutch to slip causes the ring 8 to actuate the member 6 to shut off the power and to stop the operation entirely. When the overload condition has been corrected and prior to starting up again, the collar 6 and the ring 8 need only to be pushed back to the middle of the thread 9. During such movement, the yielding of the spring 10 will permit the threads of the ring 8 to ride over the threads 9 with a sort of ratchet action so that the device may be reset without any turning movement of said threads.

It will be seen that this invention provides a simple and rugged mechanism which may be applied to practically any type of rotary drive to protect the same against overloads and to permit the device to be quickly and easily reset after operation when the overload condition has been removed.

Various changes may be made in the details of construction, within the scope of the appended claims, without departing from the spirit of this invention. Parts of the invention may be used without the whole and improvements may be added while retaining some or all of the advantages of the invention.

I claim:

1. In combination with a torque-limiting clutch having a driving member and a driven member releasable from driving engagement with said driving member by an overload, a safety shut-off comprising, a load member connected to rotate with the load driven by said clutch, a thread on said load member, an actuator having a thread engageable with said first thread, spring means yieldingly maintaining the engagement of said threads, connections from said driving member to said actuator to cause the latter to rotate with the former, power shut-off means, and connections from said actuator to operate said shut-off means, said actuator being re-settable after such operation by movement thereof axially of said threads, said spring means yielding to permit the threads to ride over each other.

2. In combination with a torque-limiting clutch having a driving member and a driven member releasable from driving engagement with said driving member by an overload, a safety shut-off comprising, a load member connected to rotate with the load driven by said clutch, a tripping member associated with said load member but movable relatively thereto, an actuator engaging said tripping member and having a yielding threaded connection with said load member, a connector connecting said actuator to rotate with said driving member of said clutch, whereby upon stoppage of said load member said threaded connection will cause movement of said actuator to move said tripping member, and yielding of said threaded connection permits shifting said tripping member to re-set the same, and power shut-off means operable by said tripping member.

3. In combination with a torque-limiting clutch having a driving member and a driven member releasable from driving engagement with said driving member by an overload, a safety shut-off comprising, a load member connected to rotate with the load driven by said clutch and having an external thread, a tripping member associated with said load member but movable relatively thereto, an actuator ring engaging said tripping member having an internal thread whose minor diameter is greater than the major diameter of said external thread of said load member, spring means engaging said actuator to normally maintain said internal thread in engagement with said external thread but yielding to permit shifting of said ring axially of said load member, a connector connecting said ring to rotate with said driving member of said clutch, and power shut-off means operable by said tripping member.

4. In combination with a torque-limiting clutch having a driving member and a driven member releasable from driving engagement with said driving member by an overload, a safety shut-off comprising, a load member connected to rotate with the load driven by said clutch, a collar movable axially and circumferentially on said load member and having an internal recess, an external thread on said load member, an actuator housed in said recess and having an internal thread yieldingly engaging said first thread, connections from said driving member to said actuator to cause the latter to rotate with the former, and power shut-off means operatively engaged by said collar.

5. In combination with a torque-limiting clutch having a driving member and a driven member releasable from driving engagement with said driving member by an overload, a safety shut-off comprising, a load member connected to rotate with the load driven by said clutch, a collar mounted on said load member for axial and circumferential movement thereon, said collar having an internal annular recess, an external thread on said load member, an actuator ring mounted in said recess and encircling said load member, said ring having an internal thread whose minor diameter is greater than the major diameter of said external thread on said load member, spring means normally maintaining said threads in yielding engagement, connections from said driving member to said ring to cause the latter to rotate with the former, and power shut-off means operatively engaged by said collar.

JACOB J. FLATON.

References Cited in the file of this patent

UNITED STATES PATENTS

| Number | Name | Date |
| --- | --- | --- |
| 1,865,438 | Friedman | July 5, 1932 |
| 2,071,756 | Manville | Feb. 23, 1937 |
| 2,233,915 | Conrad | Mar. 4, 1941 |
| 2,462,825 | Zimmerman et al. | Feb. 22, 1949 |

FOREIGN PATENTS

| Number | Country | Date |
| --- | --- | --- |
| 568,421 | Great Britain | Apr. 4, 1945 |